(12) United States Patent
Chen

(10) Patent No.: US 8,717,689 B2
(45) Date of Patent: May 6, 2014

(54) MINIATURE IMAGE PICKUP LENS

(75) Inventor: Chun-Hong Chen, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 89 days.

(21) Appl. No.: 13/355,524

(22) Filed: Jan. 21, 2012

(65) Prior Publication Data

US 2012/0194917 A1    Aug. 2, 2012

(30) Foreign Application Priority Data

Jan. 31, 2011 (TW) .............................. 100103716 A
Jan. 20, 2012 (TW) .............................. 101102605 A

(51) Int. Cl.
*G02B 9/60* (2006.01)
*G02B 3/02* (2006.01)
*G02B 9/34* (2006.01)

(52) U.S. Cl.
CPC ....................................... *G02B 9/34* (2013.01)
USPC .......................................... 359/770; 359/714

(58) Field of Classification Search
USPC .......................................... 359/714, 753, 770
See application file for complete search history.

(56) References Cited

U.S. PATENT DOCUMENTS 5,528,428 A * 6/1996 Ohtake et al. ................. 359/684

FOREIGN PATENT DOCUMENTS

| JP | 04-184311 | 7/1992 |
| JP | 2001-311871 | 11/2001 |
| JP | 2010-008562 | 1/2010 |

OTHER PUBLICATIONS

Translation of Patent Abstracts of Japan.

* cited by examiner

*Primary Examiner* — William Choi
(74) *Attorney, Agent, or Firm* — Tracy M. Heims; Apex Juris, PLLC

(57) ABSTRACT

A miniature image pickup lens includes a first lens, a second lens, a third lens, an aperture, a fourth lens, and a fifth lens in sequence along an optical axis from an object side to an image side. The first lens is a meniscus lens with negative refractive power and has a convex side facing the object side. The first lens has at least an aspheric side. The second lens is a biconvex lens with positive refractive power. The third lens is a biconcave lens with negative refractive power. The fourth lens is a biconvex lens with positive refractive power and has at least an aspheric side. The fifth lens has a negative refractive power.

9 Claims, 15 Drawing Sheets

MINIATURE IMAGE PICKUP LENS

BACKGROUND OF THE INVENTION

1. Field of the Invention

The present invention relates generally to a lens, and more particularly to a miniature image pickup lens.

2. Description of the Related Art

With advancement in technology, image devices, such as camera, video camera, microscope, and scanner, are made smaller and lighter for portability and operation that the lenses incorporated in such image devices have to reduce its size. Except that, the lenses must have high optical performance, such as high zoom ratio, high resolution, and high contrast. Consequently, small size and high optical performance are the important facts of modern lenses.

In order to raise the optical performance, more and more lens groups are provided in the zoom lens. As we know, some zoom lenses even have ten lens groups or more. It is obvious that more lens groups will cause the lens bigger and heavier. However, when the lens has fewer lens groups, it may have a small size, but the optical performance is poor.

SUMMARY OF THE INVENTION

The primary objective of the present invention is to provide a miniature zoom lens, which has a small size and high optical performance.

According to the objectives of the present invention, a miniature image pickup lens includes a first lens, a second lens, a third lens, an aperture, a fourth lens, and a fifth lens in sequence along an optical axis from an object side to an image side. The first lens is a meniscus lens with negative refractive power and has a convex side facing the object side. The first lens has at least an aspheric side. The second lens is a biconvex lens with positive refractive power. The third lens is a biconcave lens with negative refractive power. The fourth lens is a biconvex lens with positive refractive power and has at least an aspheric side. The fifth lens has negative refractive power.

Therefore, the miniature image pickup lens of the present invention is miniaturized and provides a high optical performance.

DETAILED DESCRIPTION OF THE INVENTION

First Preferred Embodiment

Figure 1:
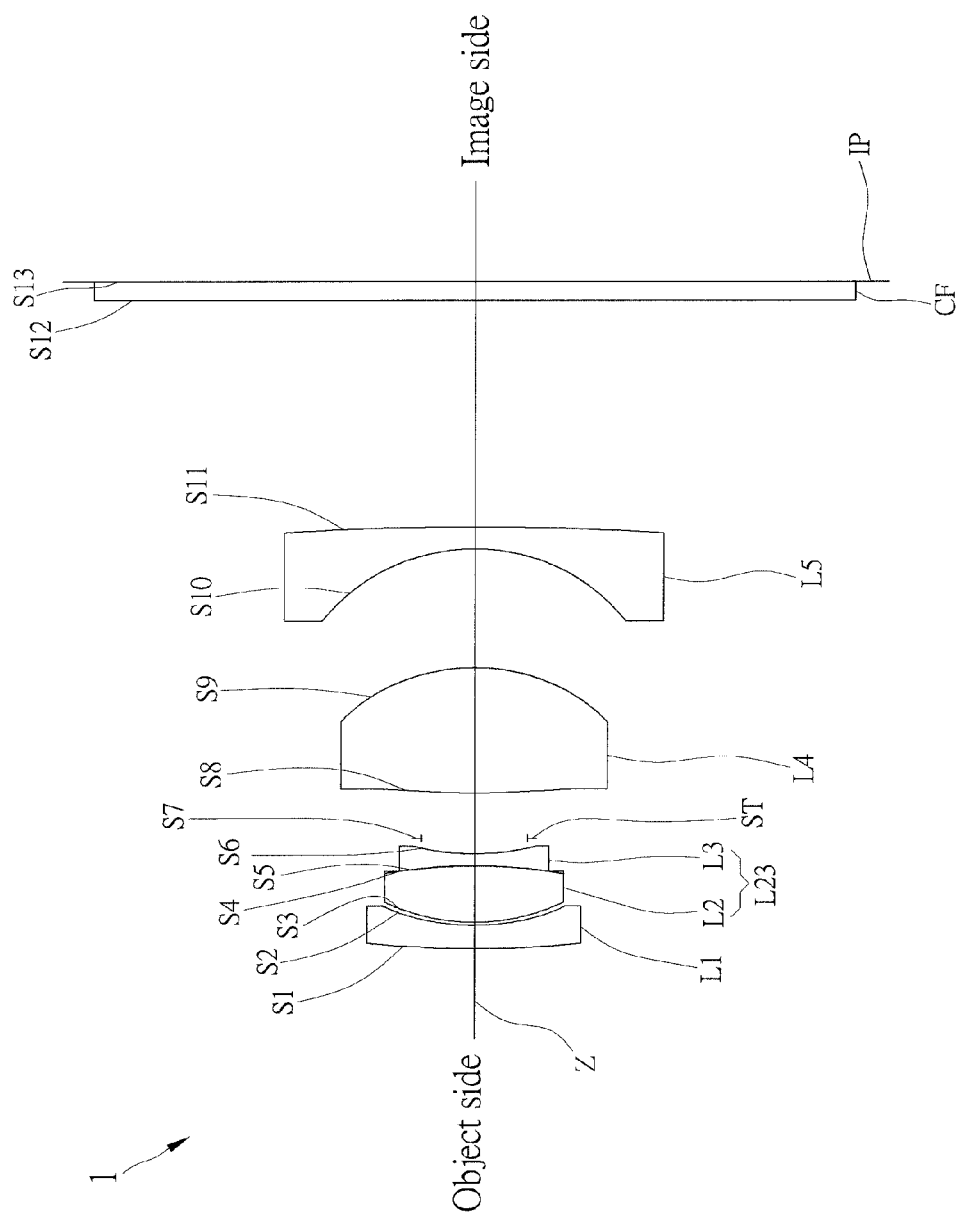
FIG. 1 is a sketch diagram of the arrangement of the lenses of a first preferred embodiment of the present invention.
Figure 2:
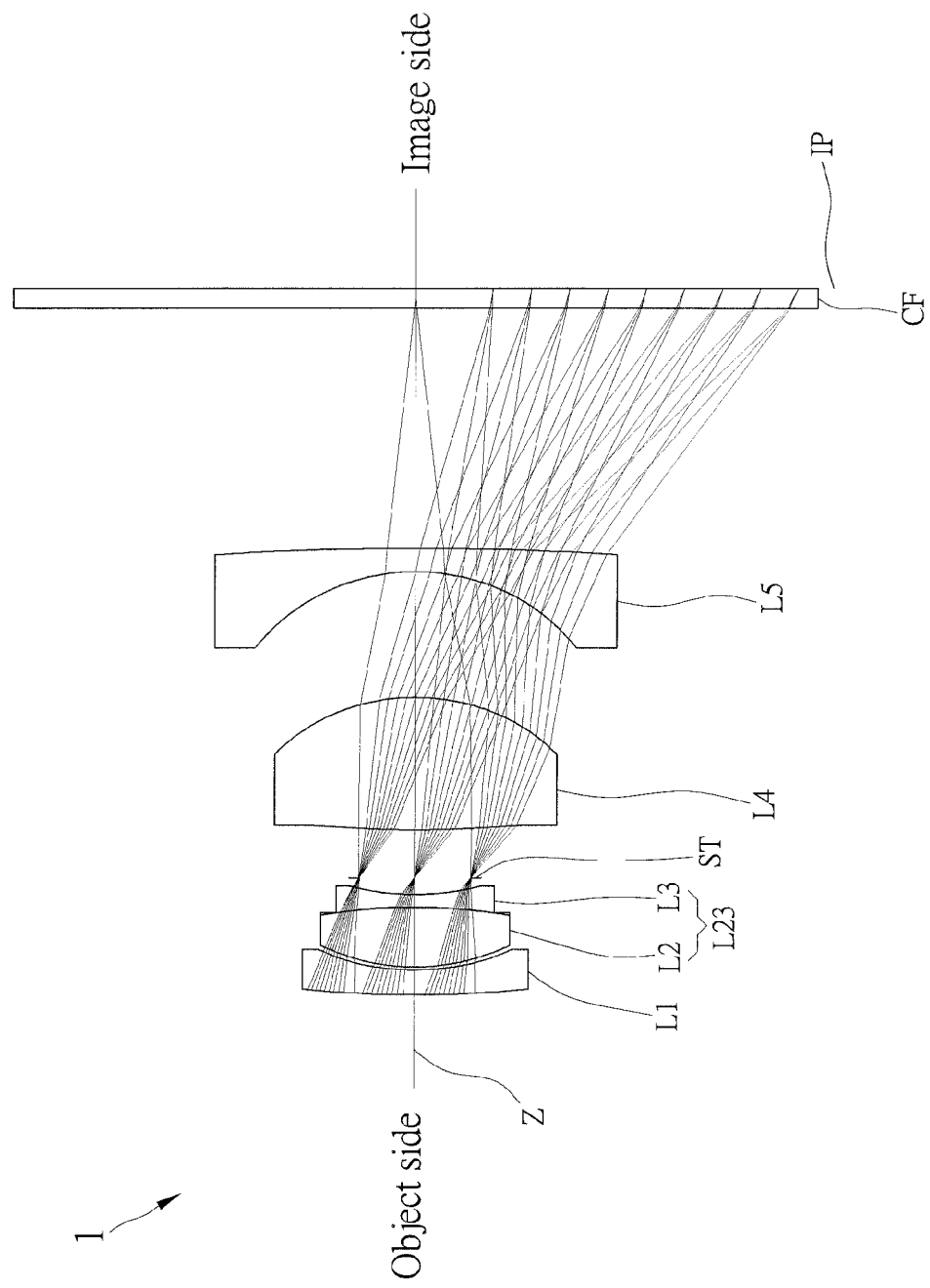
FIG. 2 is a sketch diagram of the arrangement of the lenses of the first preferred embodiment of the present invention, showing the paths of light.

FIG. 1 shows an arrangement of a miniature image pickup lens 1 of the first preferred embodiment of the present invention, and FIG. 2 shows the paths of light in the miniature image pickup lens 1. The characters of the miniature image pickup lens 1 of the first preferred embodiment are described as follow:

The miniature image pickup lens 1 includes a first lens L1, a second lens L2, a third lens L3, an aperture ST, a fourth lens L4, and a fifth lens L5 in sequence along an optical axis Z from an object side to an image side. In practice, a color filter CF, which is a glass plate, is provided between the fifth lens L5 and an image plane IP.

The first lens L1 is a glass meniscus lens with negative refractive power, and its convex side S1 faces the object side. The convex side S1 and concave side S2 of the first lens L1 are aspheric sides.

The second lens L2 is a glass biconvex lens with positive refractive power, and the third lens L3 is a glass biconcave lens with negative refractive power. The second lens L2 and the third lens L3 are coupled together to form a compound lens L23 with positive refractive power.

The fourth lens L4 is a glass biconvex lens with positive refractive power, and both its convex sides S8, S9 are aspheric sides.

The fifth lens L5 is a glass meniscus lens with negative refractive power, and its convex side S11 faces the image side.

The miniature image pickup lens 1 provides the first lens L1 with negative refractive power, the fourth lens L4 with positive refractive power, and the first and the fourth lenses L1, L4 with aspheric sides to obtain a good image pickup, a short lens, and, furthermore, a wide field of view angle about 68 degree angle (FOV).

Table 1 shows the focus length (F), F-number (Fno), radius of curvature of the lens in the optical axis Z (R), thickness of the lens in the optical axis Z (T), refractive index (Nd), and Abbe number (Vd).

TABLE 1

F = 1, Fno = 4.5

| Side | R(mm) | T(mm) | Nd | Vd | |
|---|---|---|---|---|---|
| OBJ | infinity | infinity | | | |
| S1 | 2.5394 | 0.0517 | 1.62 | 36.2634 | L1 |
| S2 | 0.5668 | 0.0063 | | | |
| S3 | 0.4527 | 0.1236 | 1.883 | 40.7651 | L2 |
| S4 | −1.1523 | 0.0002 | 1.52 | 52 | Coupling side |
| S5 | −1.1523 | 0.0266 | 1.6889 | 31.0755 | L3 |
| S6 | 0.5416 | 0.034 | | | |
| S7 | infinity | 0.1 | | | ST |
| S8 | 2.0613 | 0.2752 | 1.5891 | 61.1526 | L4 |
| S9 | −0.4224 | 0.2606 | | | |
| S10 | −0.4279 | 0.0482 | 1.5481 | 45.7843 | L5 |
| S11 | −6.4833 | 0.4975 | | | |
| S12 | infinity | 0.0415 | 1.5168 | 64.1983 | CF |
| S13 | infinity | 0.0003 | | | |

The depression z of the aspheric sides S1, S2, S8, and S9 may be obtained by the following equation:

$$z = \frac{ch^2}{1 + [1 - (k+1)c^2h^2]^{\frac{1}{2}}} + Ah^4 + Bh^6 + Ch^8 + Dh^{10} + Eh^{12} + Fh^{14} + Gh^{16}$$

wherein:
z is the depression of the aspheric side;
c is the reciprocal of radius of curvature;
h is the radius of aperture on the surface;
k is conic constant;
A~G are coefficients of the radius of aperture h.
The conic constants (k) of the aspheric sides and the coefficients A~G are shown in Table 2.

TABLE 2

| | k | A | B | C | D | E | F | G |
|---|---|---|---|---|---|---|---|---|
| S1 | 44.40863 | 0.312495 | −6.0779 | −298.348 | 1342.324 | 81631.84 | −800654 | −4330802 |
| S2 | 2.648891 | 1.265762 | −0.33697 | 33.32922 | −35747.1 | 599035.8 | 18366456 | −4.4E+08 |
| S8 | −108.718 | 0.167342 | −11.3521 | 29.59956 | −3427.74 | −40797.4 | 538003.1 | −1521888 |
| S9 | −0.20663 | 0.04388 | −10.4596 | 86.52265 | −986.985 | −4891.41 | 55711.71 | −1129689 |

The arrangement of lenses and the apertures ST as described above may reduce the size of the miniature image pickup lens 1 of the present invention. The miniature image pickup lens 1 still provides a good optical performance as shown in FIG. 3A to FIG. 3D.

Figure 3A:
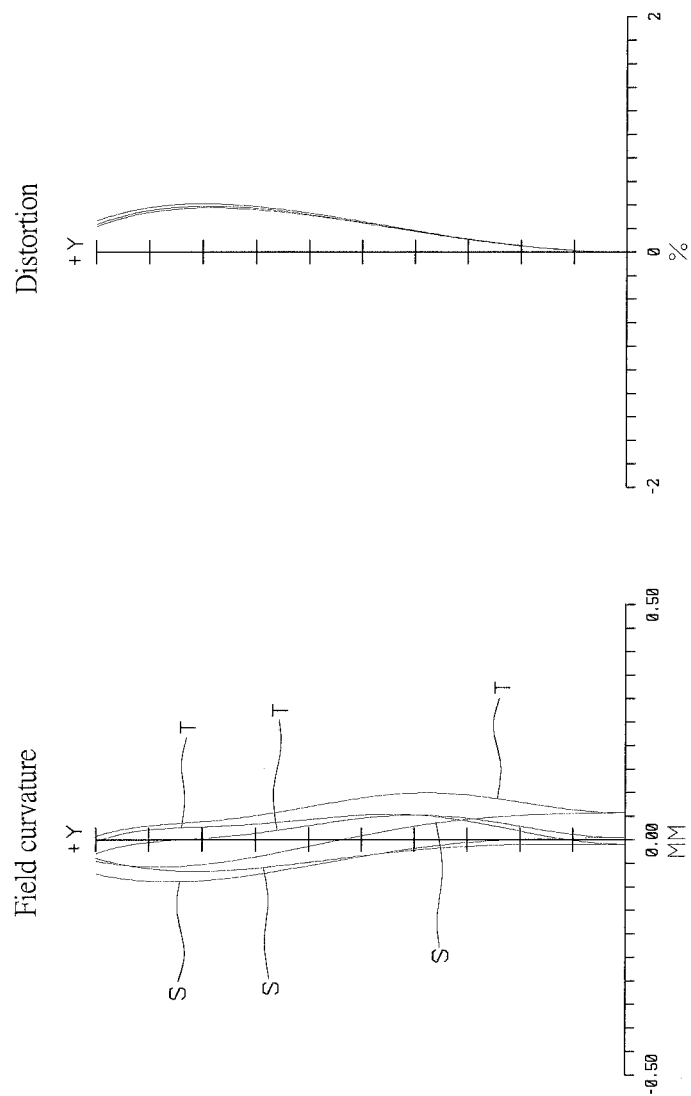
FIG. 3A shows a field curvature diagram and a distortion diagram of the first preferred embodiment of the present invention.
Figure 3B:
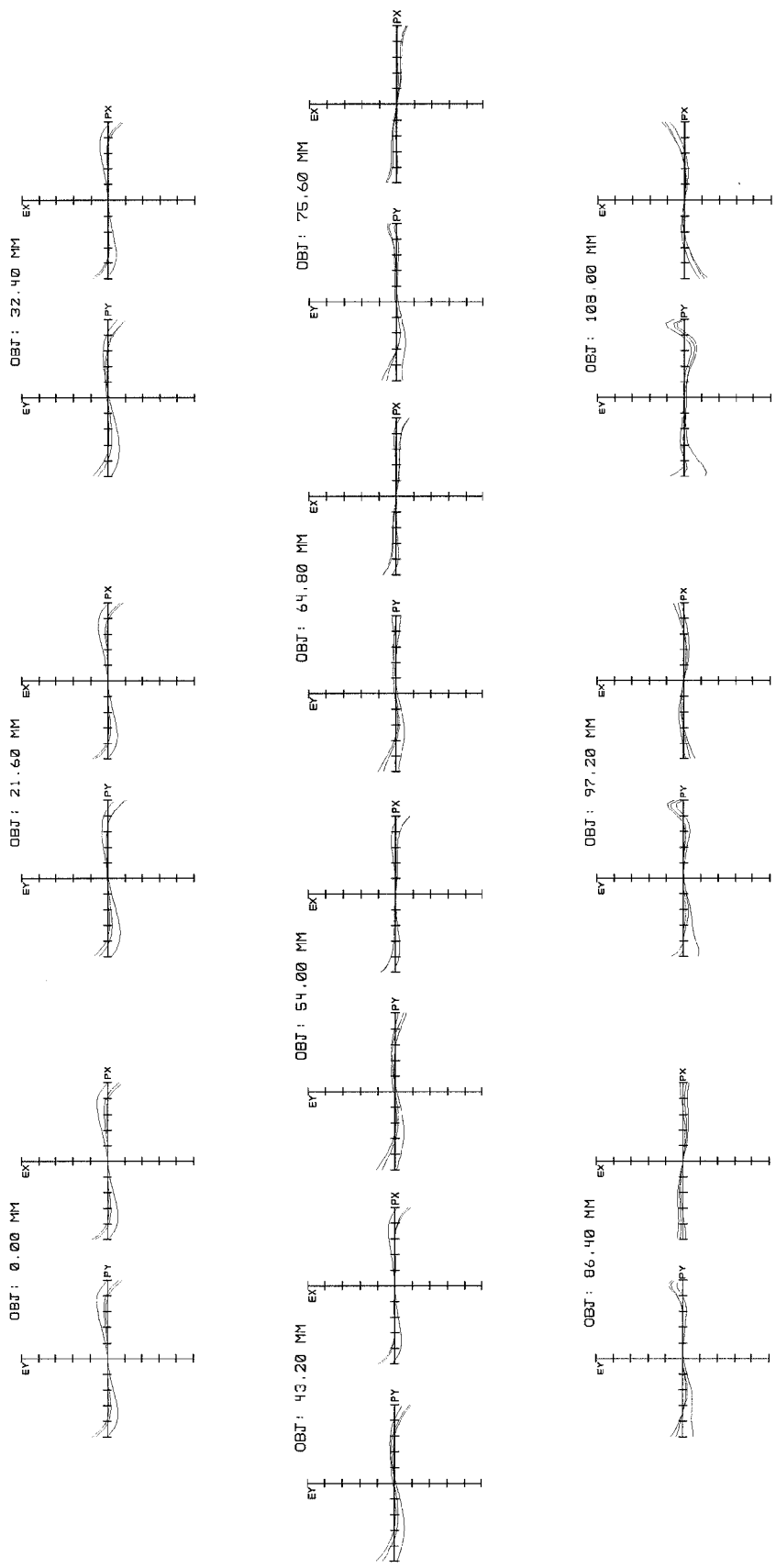
FIG. 3B shows a transverse ray fan diagram of the first preferred embodiment of the present invention.
Figure 3:
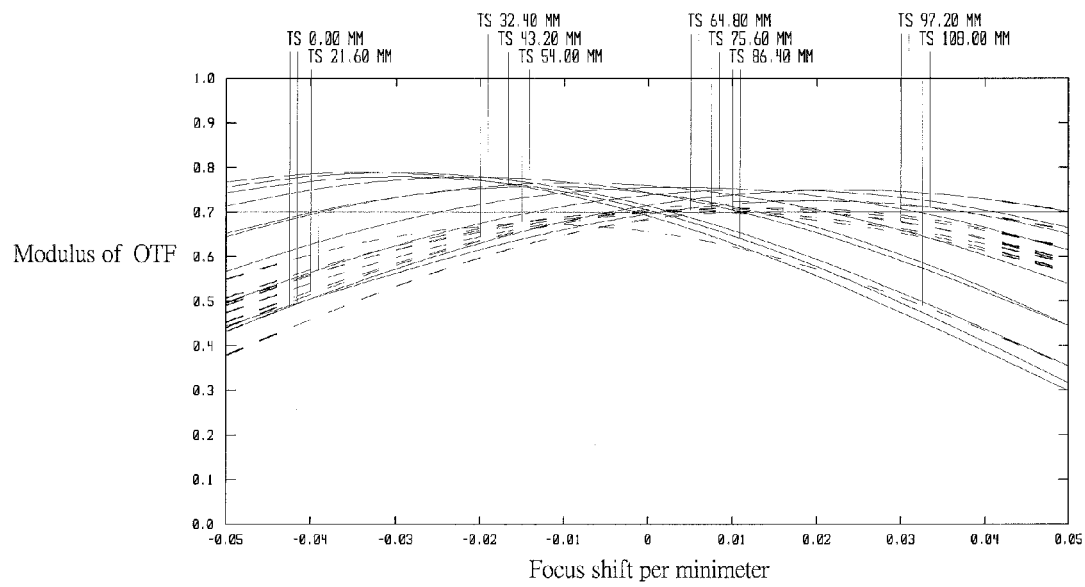
FIG. 3C shows a through focus MTF diagram of the first preferred embodiment of the present invention.
FIG. 3D shows a spatial frequency MTF diagram of the first preferred embodiment of the present invention.
Figure 3:
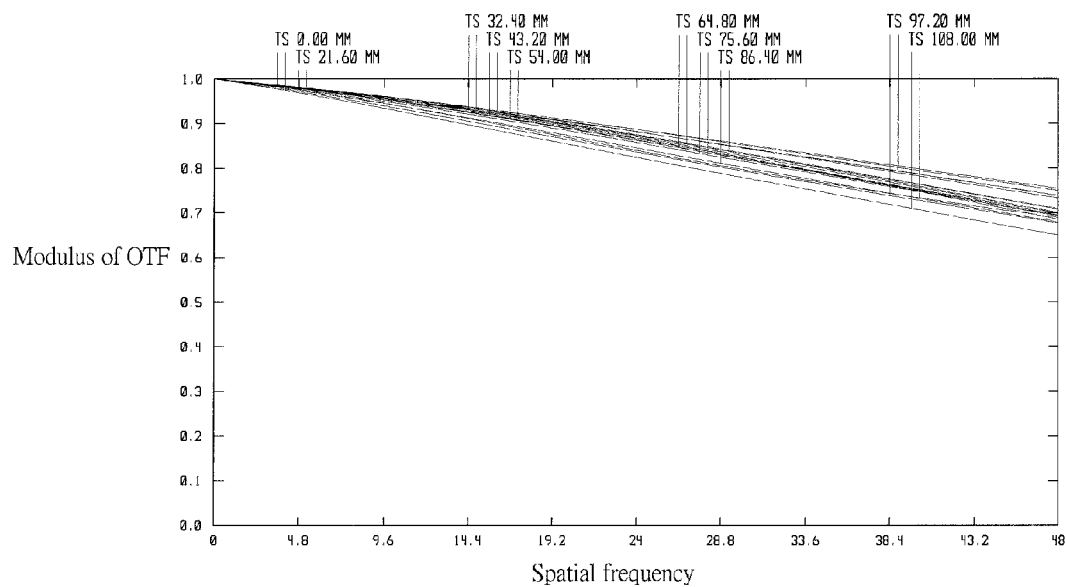

FIG. 3A shows field curvature diagram and distortion diagram, FIG. 3B shows transverse ray fan diagram, FIG. 3C shows through focus MTF diagram, and FIG. 3D shows spatial frequency MTF diagram.

In FIG. 3A, it shows that the maximum field curvature is about 0.1 mm and −0.1 mm, and the maximum distortion is about 0.6%. FIG. 3B and FIG. 3C show that it provides good resolution in all view fields. FIG. 3D shows that the optical MTF is greater than 60% in 48 lp/mm. All the results show that the resolution of the miniature image pickup lens 1 of the present invention is qualified.

Second Preferred Embodiment

Figure 4:
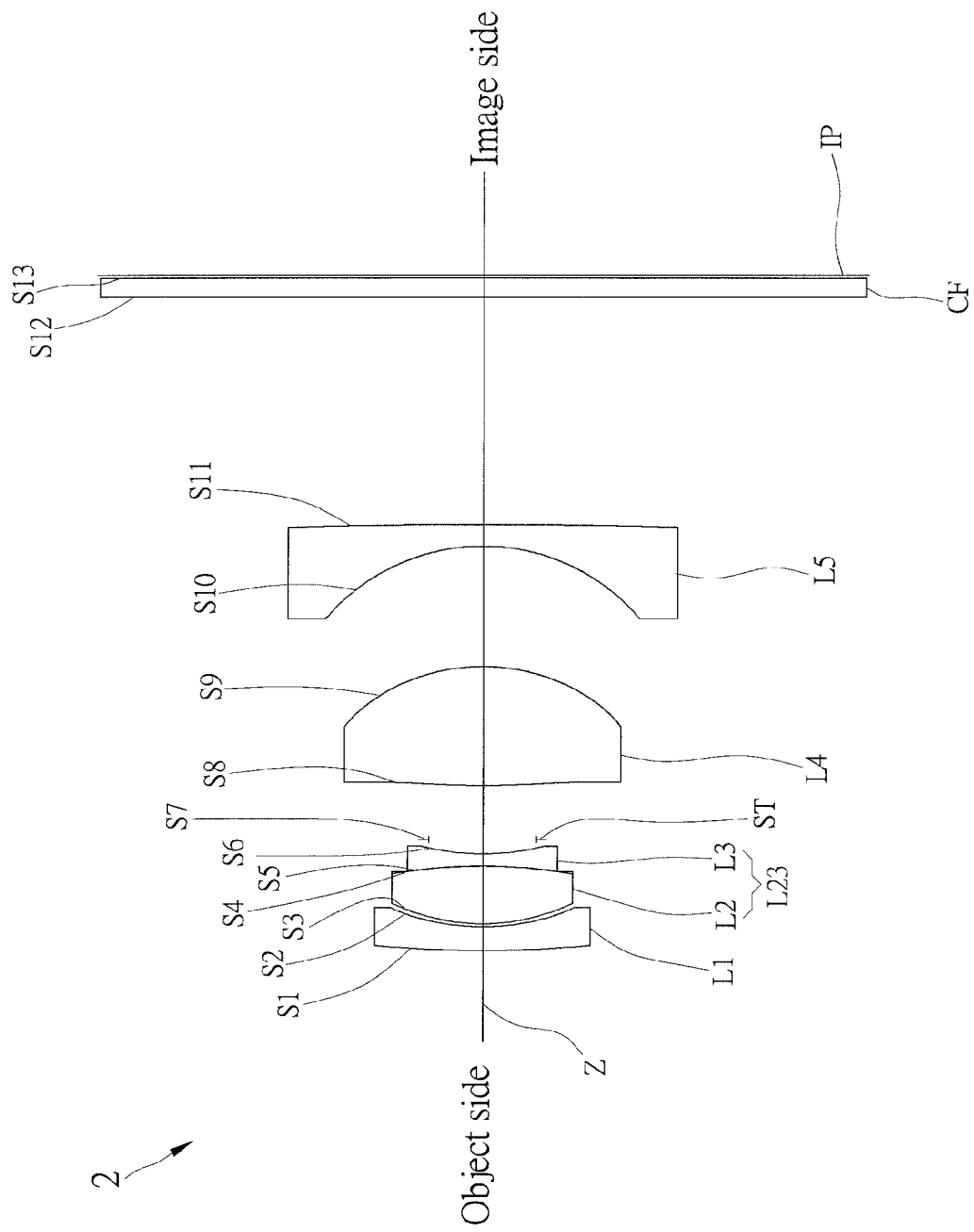
FIG. 4 is a sketch diagram of the arrangement of the lenses of a second preferred embodiment of the present invention.
Figure 5:
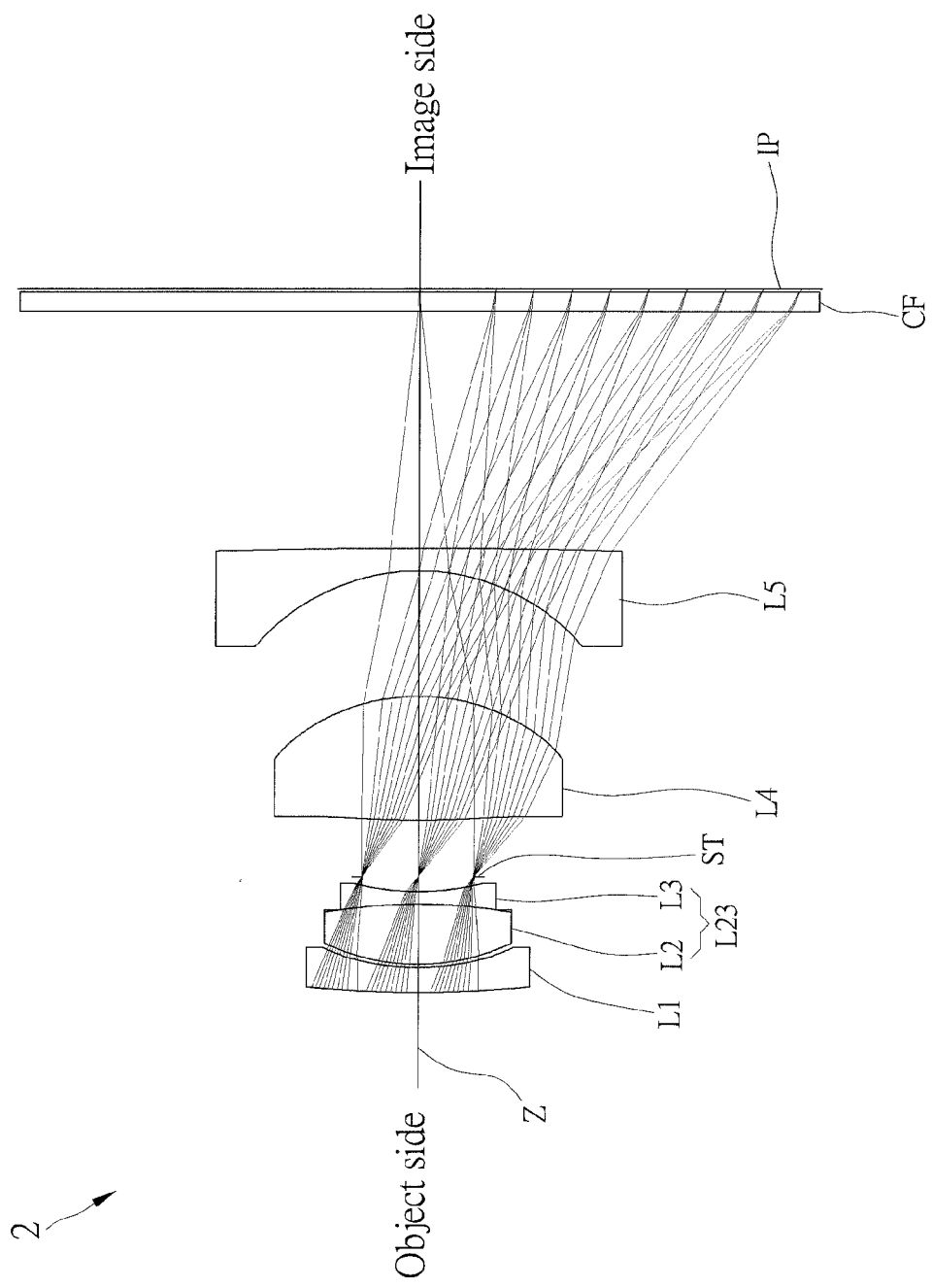
FIG. 5 is a sketch diagram of the arrangement of the lenses of the second preferred embodiment of the present invention, showing the paths of light.

As shown in FIG. 4 and FIG. 5, a miniature image pickup lens 2 of the second preferred embodiment of the present invention includes a first lens L1, a second lens L2, a third lens L3, an aperture ST, a fourth lens L4, and a fifth lens L5 along an optical axis Z from an object side to an image side. In practice, a color filter CF, which is a glass plate, is provided between the fifth lens L5 and an image IP.

The first lens L1 is a glass meniscus lens with negative refractive power, and its convex side S1 faces the object side. The convex side S1 and concave side S2 of the first lens L1 are aspheric sides.

The second lens L2 is a glass biconvex lens with positive refractive power, and the third lens L3 is a glass biconcave lens with negative refractive power. The second lens L2 and the third lens L3 are coupled together to form a compound lens L23 with positive refractive power.

The fourth lens L4 is a glass biconvex lens with positive refractive power, and both its convex sides S8, S9 are aspheric sides.

The fifth lens L5 is a glass meniscus lens with negative refractive power, and its convex side S11 faces the image side.

The miniature image pickup lens 2 provides the first lens L1 with negative refractive power, the fourth lens L4 with positive refractive power, and the first and the fourth lenses L1, L4 with aspheric sides to obtain a good image pickup, a short lens, and, furthermore, a wide field of view angle (FOV).

Table 3 shows the focus length (F), F-number (Fno), radius of curvature of the lens in the optical axis Z (R), thickness of the lens in the optical axis Z (T), refractive index (Nd), and Abbe number (Vd).

TABLE 3

F = 1, Fno = 4.5

| Side | R(mm) | T(mm) | Nd | Vd | |
|---|---|---|---|---|---|
| OBJ | infinity | infinity | | | |
| S1 | 2.458 | 0.0521 | 1.62 | 36.2634 | L1 |
| S2 | 0.5652 | 0.0063 | | | |
| S3 | 0.4543 | 0.1247 | 1.883 | 40.7651 | L2 |
| S4 | −1.1316 | 0.0002 | 1.52 | 52 | Coupling side |
| S5 | −1.1316 | 0.0264 | 1.6889 | 31.0755 | L3 |
| S6 | 0.5482 | 0.0312 | | | |
| S7 | infinity | 0.1172 | | | ST |
| S8 | 2.169 | 0.2571 | 1.5891 | 61.1526 | L4 |
| S9 | −0.4236 | 0.2607 | | | |
| S10 | −0.4452 | 0.0474 | 1.5481 | 45.7843 | L5 |
| S11 | −14.3354 | 0.4917 | | | |
| S12 | infinity | 0.0415 | 1.5168 | 64.1983 | CF |
| S13 | infinity | 0.0059 | | | |

The depression z of the aspheric sides S1, S2, S8, and S9 may be obtained by the following equation:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein:

z is the depression of the aspheric side;
c is the reciprocal of radius of curvature;
h is the radius of aperture on the surface;
k is conic constant;
A~G are coefficients of the radius of aperture h.

The conic constants (k) of the aspheric sides and the coefficients A~G are shown in Table 4.

TABLE 4

|    | k        | A         | B        | C        | D         | E         | F         | G         |
|----|----------|-----------|----------|----------|-----------|-----------|-----------|-----------|
| S1 | 0        | 4.778803  | −50.5563 | 96.6939  | 5941.564  | −63101.3  | −374490   | 5697514   |
| S2 | 5.869166 | 7.511637  | −76.7275 | 2009.013 | −45294.7  | 342056.9  | 5852662   | −1.5E+08  |
| S8 | 84.25778 | −1.97592  | −13.4828 | −784.831 | −21380.9  | 415039    | 18699221  | −7.3E+08  |
| S9 | −0.23177 | −0.16573  | −14.8256 | 430.1148 | −9394.64  | −5787.26  | 2060658   | −1.9E+07  |

The arrangement of lenses and the apertures ST as described above may reduce the size of the miniature image pickup lens 2 of the present invention. The miniature image pickup lens 2 still provides a good optical performance as shown in FIG. 6A to FIG. 6D.

Figure 6:
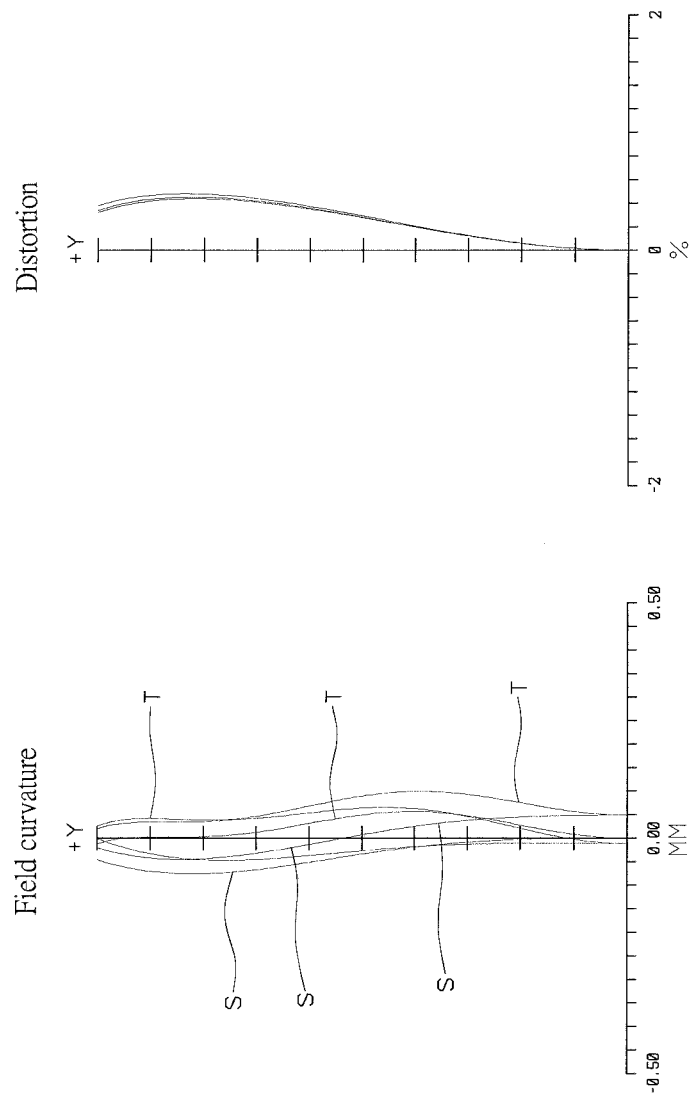
FIG. 6A shows a field curvature diagram and a distortion diagram of the second preferred embodiment of the present invention.
FIG. 6B shows a transverse ray fan diagram of the second preferred embodiment of the present invention.
FIG. 6C shows a through focus MTF diagram of the second preferred embodiment of the present invention.
FIG. 6D shows a spatial frequency MTF diagram of the second preferred embodiment of the present invention.
Figure 6B:
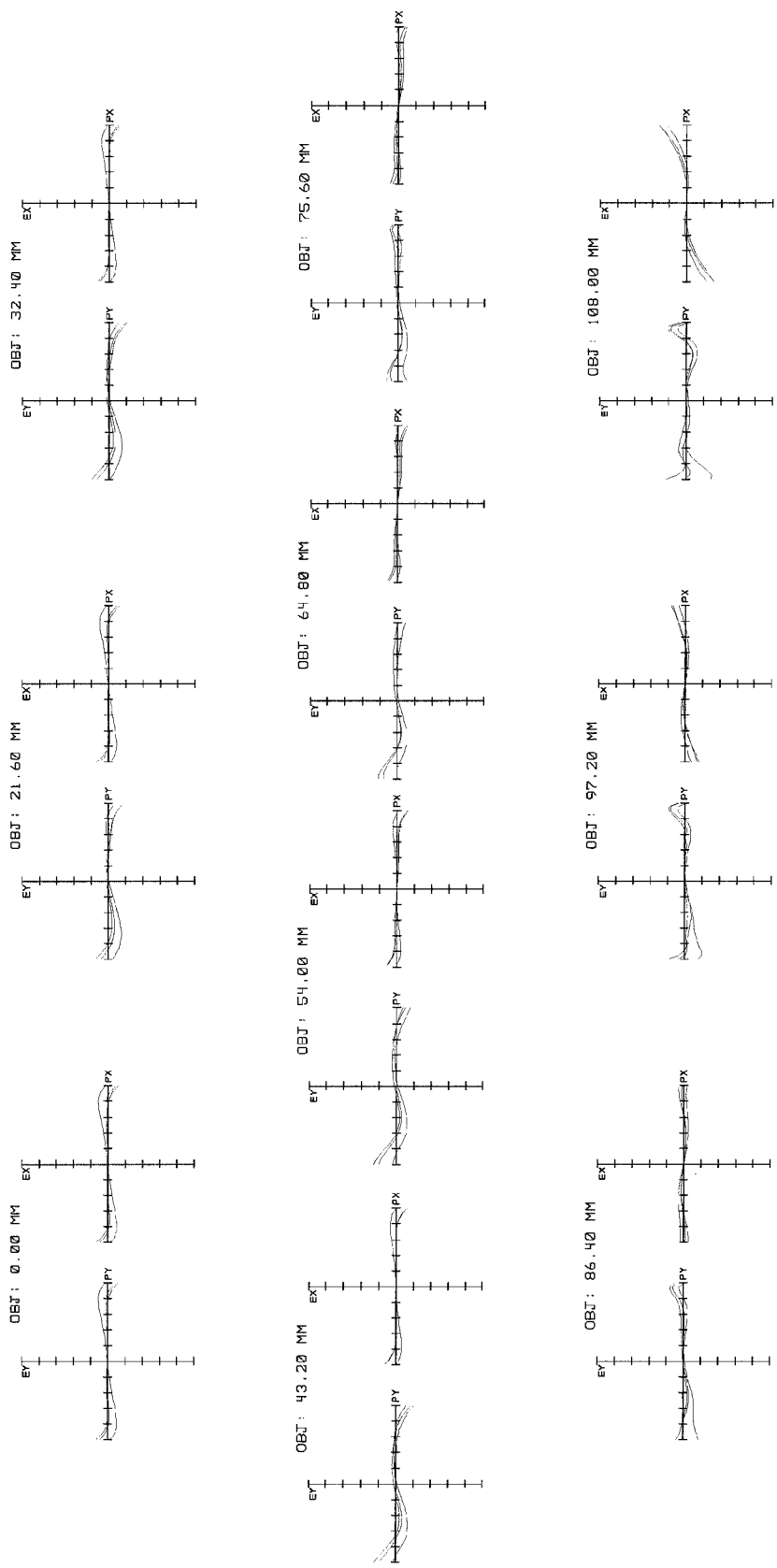
Figure 6:
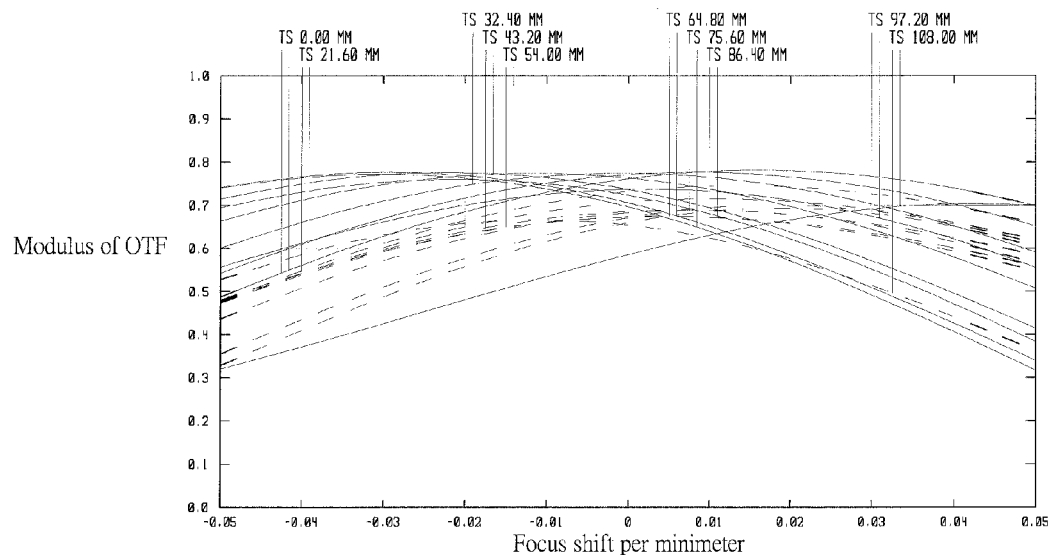
Figure 6:
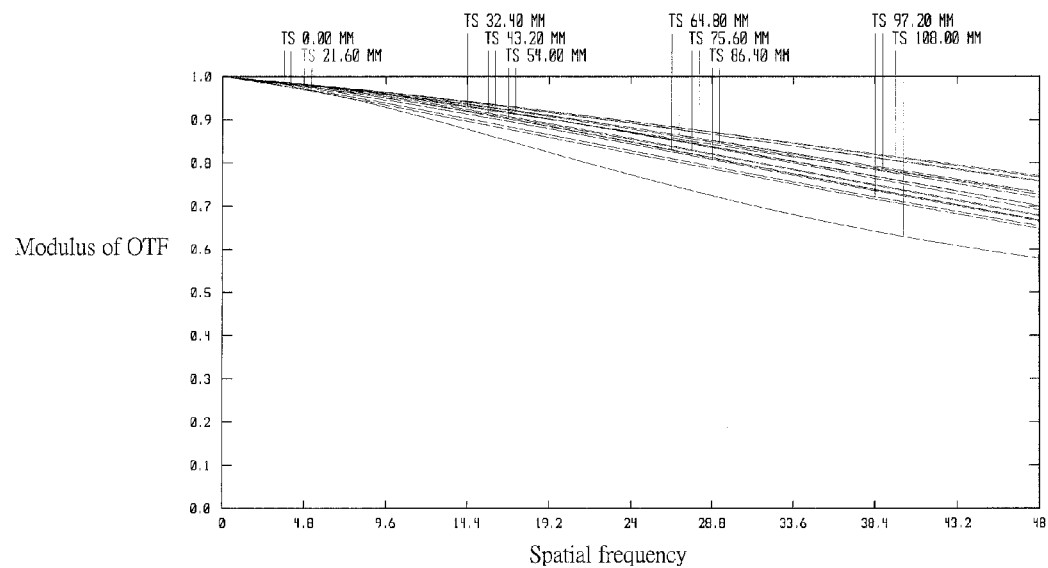

FIG. 6A shows field curvature diagram and distortion diagram, FIG. 6B shows transverse ray fan diagram, FIG. 6C shows through focus MTF diagram, and FIG. 6D shows spatial frequency MTF diagram.

In FIG. 6A, it shows that the maximum field curvature is about 0.1 mm and −0.1 mm, and the maximum distortion is about 0.6%. FIG. 6B and FIG. 6C show that it provides good resolution in all view fields. FIG. 6D shows that the optical MTF is greater than 50% in 48 lp/mm. All the results show that the resolution of the miniature image pickup lens 2 of the present invention is qualified.

Third Preferred Embodiment

Figure 7:
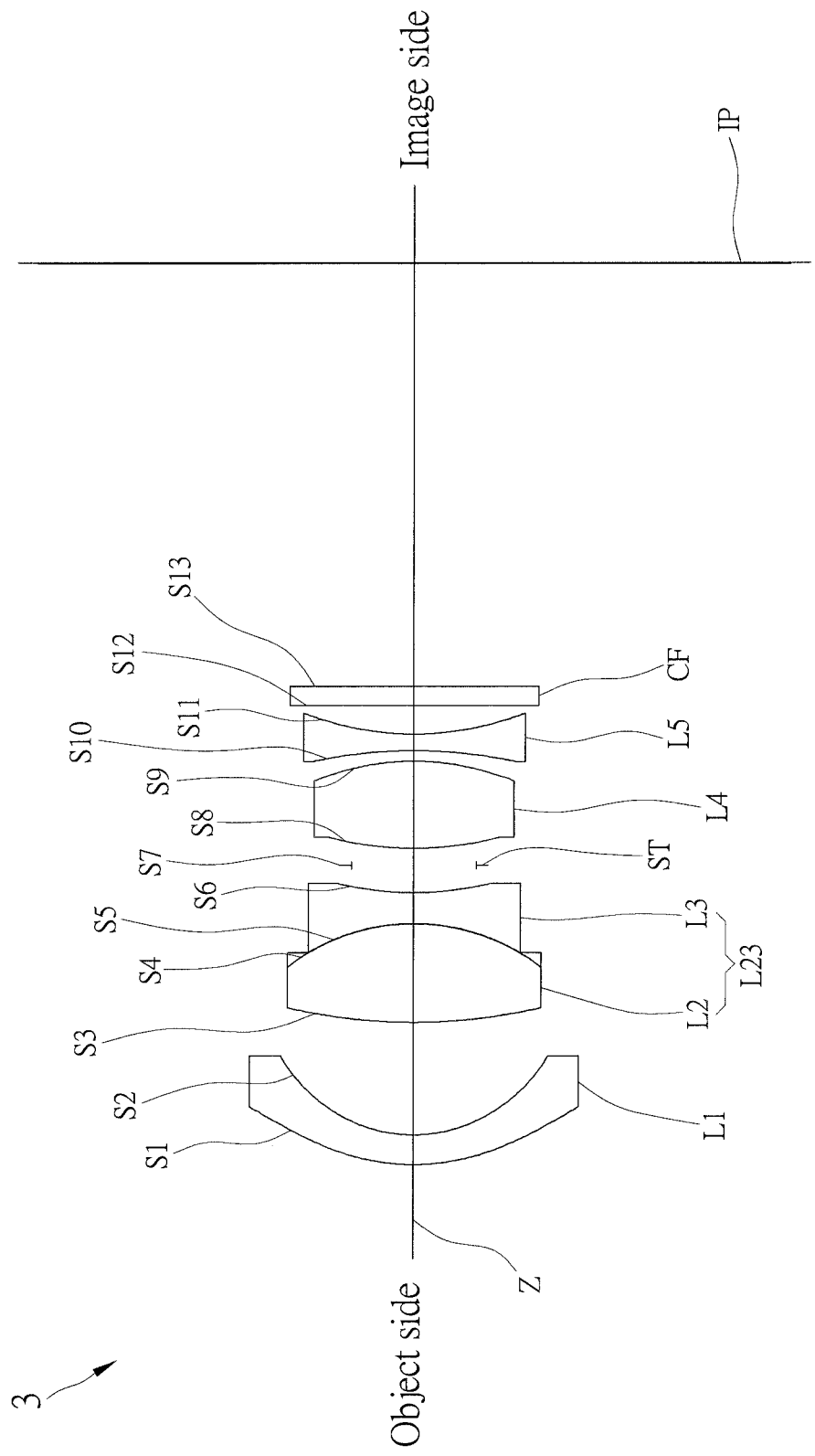
FIG. 7 is a sketch diagram of the arrangement of the lenses of a third preferred embodiment of the present invention.
Figure 8:
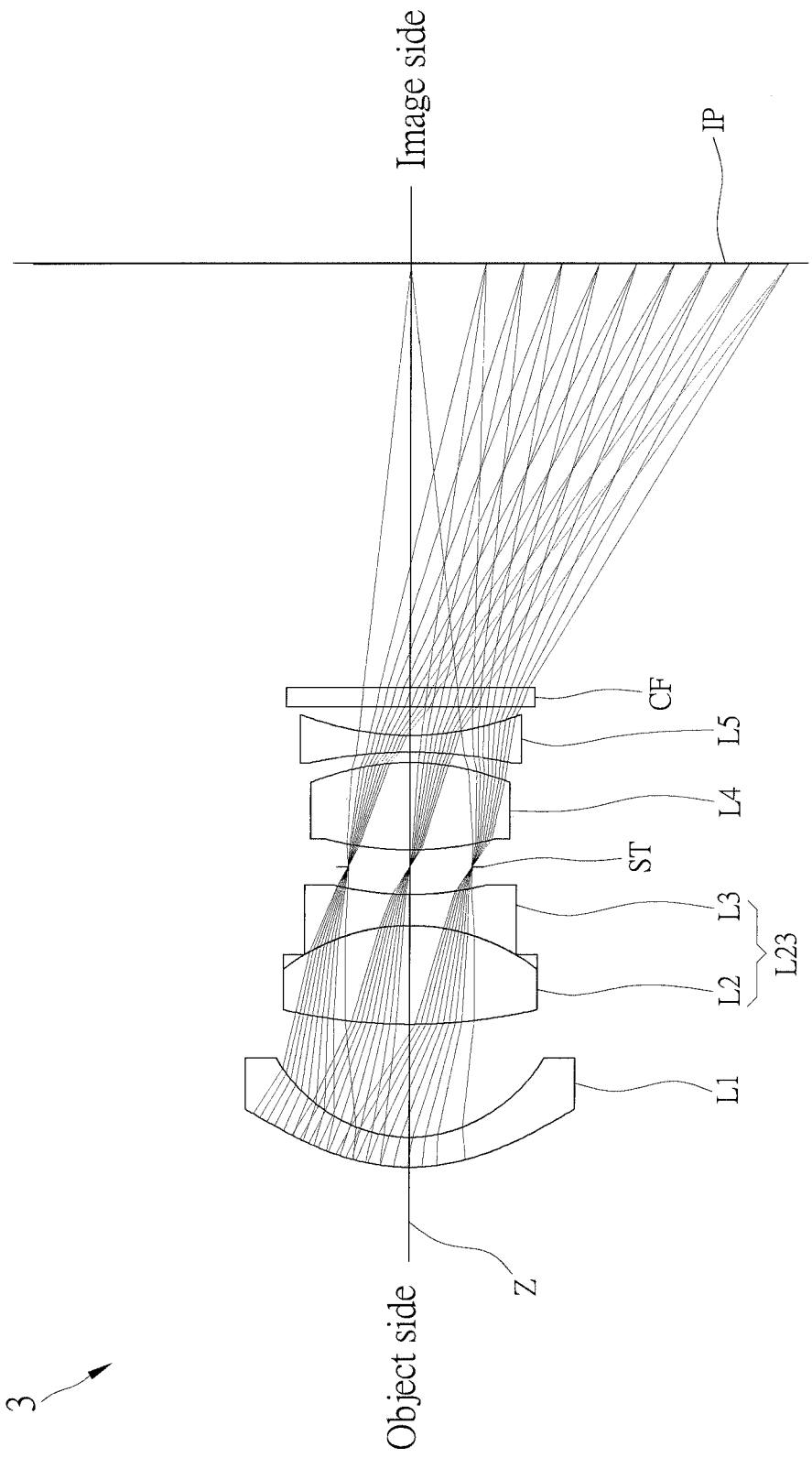
FIG. 8 is a sketch diagram of the arrangement of the lenses of the third preferred embodiment of the present invention, showing the paths of light.

As shown in FIG. 7 and FIG. 8, a miniature image pickup lens 3 of the third preferred embodiment of the present invention includes a first lens L1, a second lens L2, a third lens L3, an aperture ST, a fourth lens L4, and a fifth lens L5 along an optical axis Z from an object side to an image side. In practice, a color filter CF, which is a glass plate, is provided between the fifth lens L5 and an image IP.

The first lens L1 is a glass meniscus lens with negative refractive power, and its convex side S1 faces the object side. The convex side S1 and concave side S2 of the first lens L1 are aspheric sides.

The second lens L2 is a glass biconvex lens with positive refractive power, and the third lens L3 is a glass biconcave lens with negative refractive power. The second lens L2 and the third lens L3 are coupled together to form a compound lens L23 with negative refractive power.

The fourth lens L4 is a glass biconvex lens with positive refractive power, and both its convex sides S8, S9 are aspheric sides.

The fifth lens L5 is a biconcave glass lens with negative refractive power.

The miniature image pickup lens 3 provides the first lens L1 with negative refractive power, the fourth lens L4 with positive refractive power, and the side first and the fourth lenses L1, L4 with aspheric sides to obtain a good image pickup, a short lens, and, furthermore, a wide field of view angle (FOV).

Table 5 shows the focus length (F), F-number (Fno), radius of curvature of the lens in the optical axis Z (R), thickness of the lens in the optical axis Z (T), refractive index (Nd), and Abbe number (Vd).

TABLE 5

| F = 1, Fno = 4.5 | | | | |
|---|---|---|---|---|
| Side | R(mm) | T(mm) | Nd | Vd | |
| OBJ | Infinity | Infinity | | | |
| S1 | 0.4402 | 0.062 | 1.7308 | 40.5081 | L1 |
| S2 | 0.2979 | 0.2349 | | | |
| S3 | 1.164 | 0.2047 | 1.883 | 40.7651 | L2 |
| S4 | −0.4271 | 0.0002 | 1.52 | 52 | Coupling side |
| S5 | −0.4271 | 0.0646 | 1.5927 | 35.3101 | L3 |
| S6 | 0.652 | 0.0572 | | | |
| S7 | infinity | 0.0355 | | | ST |
| S8 | 0.7043 | 0.1813 | 1.6935 | 53.1858 | L4 |
| S9 | −0.4877 | 0.0216 | | | |
| S10 | −0.987 | 0.0351 | 1.5927 | 35.3101 | L5 |
| S11 | 0.6331 | 0.0584 | | | |
| S12 | infinity | 0.0409 | 1.5168 | 64.1983 | CF |
| S13 | infinity | 0.8816 | | | |

The depression z of the aspheric sides S1, S2, S8, and S9 may be obtained by the following equation:

$$z = \frac{ch^2}{1+[1-(k+1)c^2h^2]^{\frac{1}{2}}} + Ah^4 + Bh^6 + Ch^8 + Dh^{10} + Eh^{12} + Fh^{14} + Gh^{16}$$

wherein:

z is the depression of the aspheric side;

c is the reciprocal of radius of curvature;

h is the radius of aperture on the surface;

k is conic constant;

A~G are coefficients of the radius of aperture h.

The conic constants (k) of the aspheric sides and the coefficients A~G are shown in Table 6.

TABLE 6

| | k | A | B | C | D | E | F | G |
|---|---|---|---|---|---|---|---|---|
| S1 | −0.42282 | −1.06933 | −3.07125 | −135.49 | 1278.982 | 4060.821 | −122319 | 474565.1 |
| S2 | −0.22653 | −0.45821 | 9.498346 | −466.74 | 6410.741 | 26399.75 | −802700 | 3685701 |
| S8 | −2.38987 | 0.558292 | 15.05461 | −1343.98 | 67938.69 | −1123327 | 3824434 | −7.1E+07 |
| S9 | −0.7415 | 1.2086 | 35.89209 | −1721.25 | 43673.31 | −291747 | −1556087 | −9376629 |

The arrangement of lenses and the apertures ST as described above may reduce the size of the miniature image pickup lens 3 of the present invention. The miniature image pickup lens 3 still provides a good optical performance as shown in FIG. 9A to FIG. 9D.

Figure 9A:
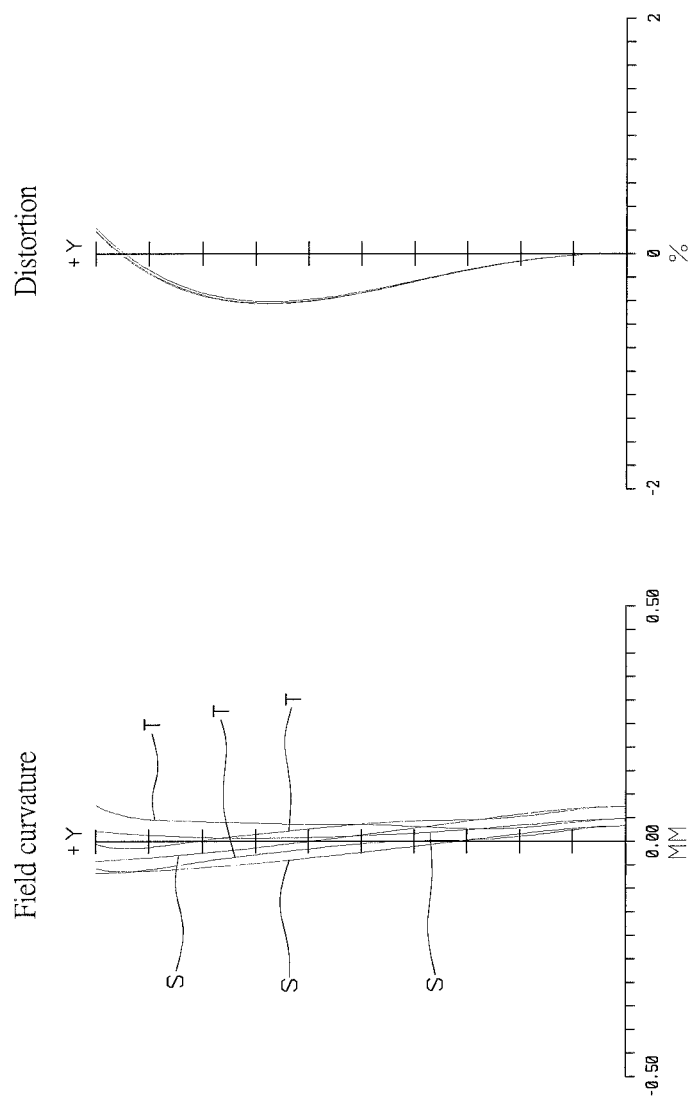
FIG. 9A shows a field curvature diagram and a distortion diagram of the third preferred embodiment of the present invention.
Figure 9B:
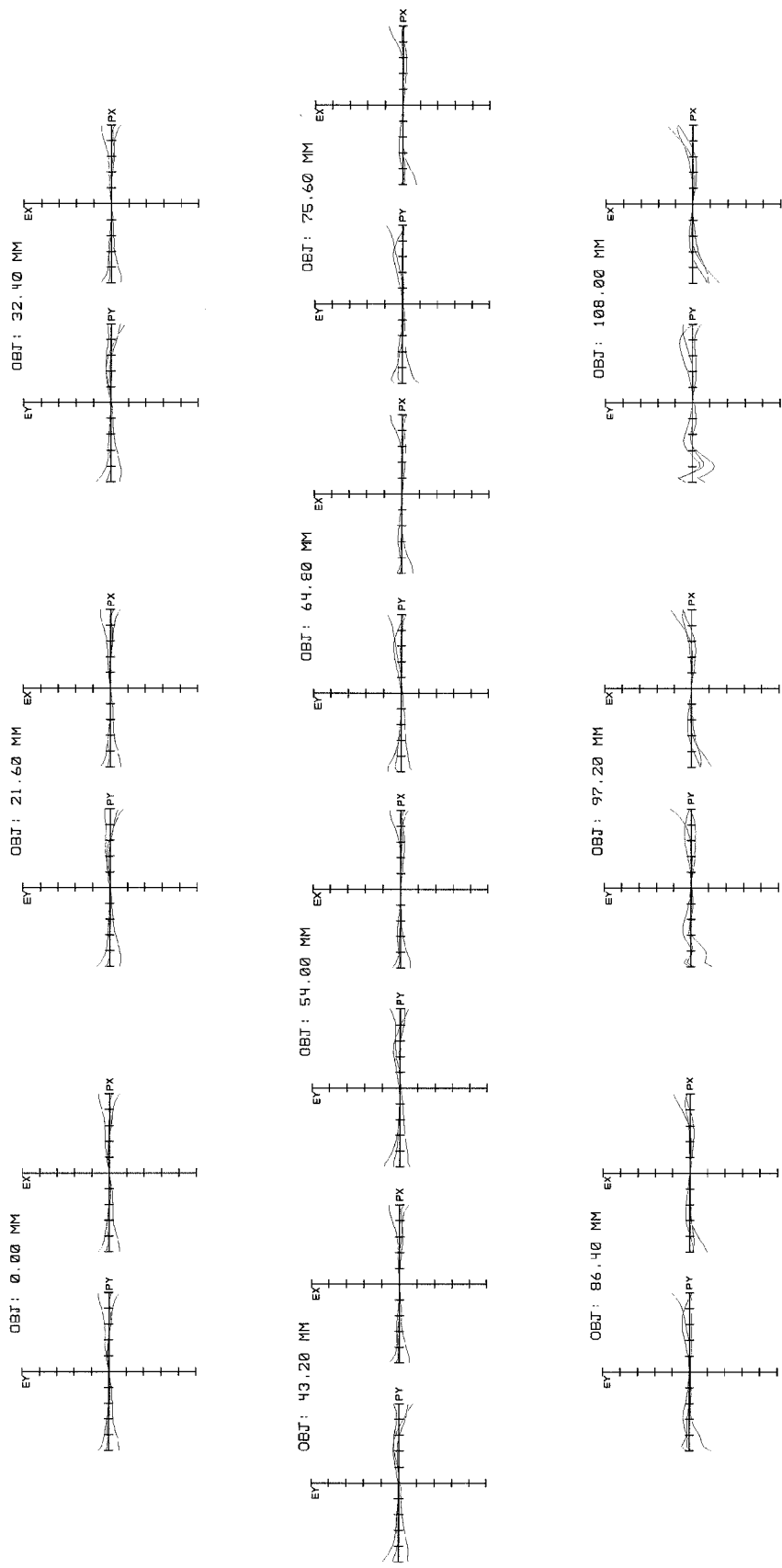
FIG. 9B shows a transverse ray fan diagram of the third preferred embodiment of the present invention.
Figure 9:
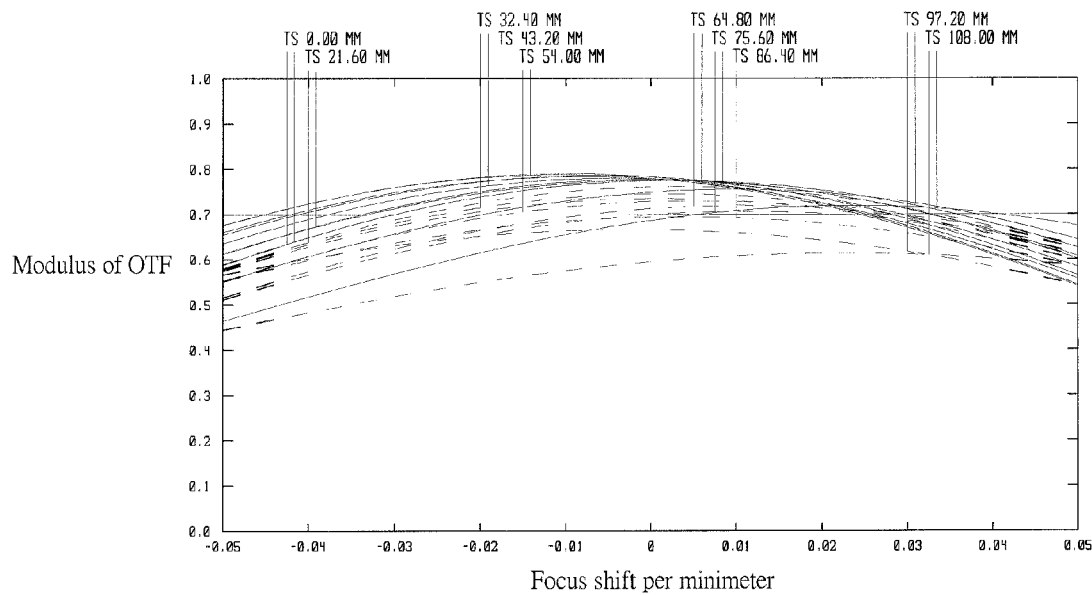
FIG. 9C shows a through focus MTF diagram of the third preferred embodiment of the present invention.
FIG. 9D shows a spatial frequency MTF diagram of the third preferred embodiment of the present invention.
Figure 9:
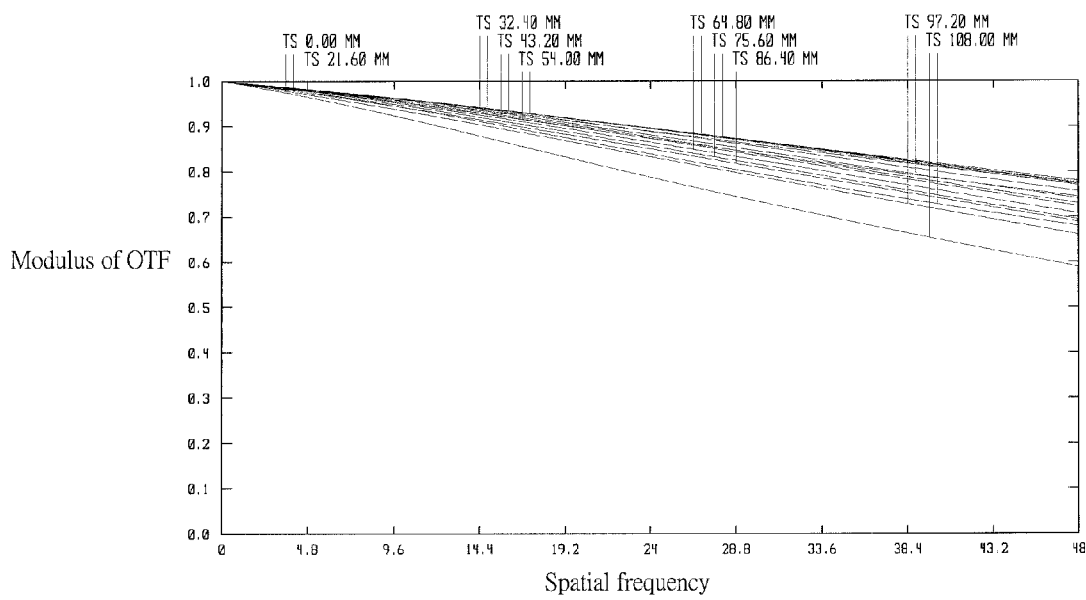

FIG. 9A shows field curvature diagram and distortion diagram, FIG. 9B shows transverse ray fan diagram, FIG. 9C shows through focus MTF diagram, and FIG. 9D shows spatial frequency MTF diagram.

In FIG. 9A, it shows that the maximum field curvature is about 0.1 mm and −0.1 mm, and the maximum distortion is about −0.6%. FIG. 9B and FIG. 9C show that it provides good resolution in all view fields. FIG. 9D shows that the optical MTF is greater than 50% in 48 lp/mm. All the results show that the resolution of the miniature image pickup lens 3 of the present invention is qualified.

In conclusion, the miniature image pickup lens of the present invention has the features of small size and high optical performance.

The description above is a few preferred embodiments of the present invention and the equivalence of the present invention is still in the scope of claim construction of the present invention.

What is claimed is:

1. A miniature image pickup lens, in sequence along an optical axis from an object side to an image side, consisting of:
    a first lens being a meniscus lens with negative refractive power and having a convex side facing the object side, wherein the first lens has at least an aspheric side;
    a second lens being a biconvex lens with positive refractive power;
    a third lens being a biconcave lens with negative refractive power;
    an aperture;
    a fourth lens being a biconvex lens with positive refractive power, wherein the fourth lens has at least an aspheric side; and
    a fifth lens having a negative refractive power.

2. The miniature image pickup lens as defined in claim 1, wherein the first lens, the second lens, the third lens, the fourth lens, and the fifth lens are made of glass.

3. The miniature image pickup lens as defined in claim 1, wherein both sides of the first lens are aspheric sides.

4. The miniature image pickup lens as defined in claim 1, wherein both sides of the fourth lens are aspheric sides.

5. The miniature image pickup lens as defined in claim 1, wherein the second lens and the third lens are coupled together to form a compound lens with positive refractive power.

6. The miniature image pickup lens as defined in claim 1, wherein the second lens and the third lens are coupled together to form a compound lens with negative refractive power.

7. The miniature image pickup lens as defined in claim 1, further comprising a color filter between the fifth lens and the image side, wherein the color filter is a glass plate.

8. The miniature image pickup lens as defined in claim 1, wherein the fifth lens is a meniscus lens and has a convex side facing the image side.

9. The miniature image pickup lens as defined in claim 1, wherein the fifth lens is a biconcave lens.

* * * * *